US007253844B2

(12) United States Patent
Hiltunen et al.

(10) Patent No.: US 7,253,844 B2
(45) Date of Patent: Aug. 7, 2007

(54) METHOD AND ARRANGEMENT FOR SYNCHRONISING ON-SCREEN DISPLAY FUNCTIONS DURING ANALOG SIGNAL RECEPTION

(75) Inventors: Reino J. Hiltunen, Merimasku (FI); Raimo Santahuhta, Lieto (FI)

(73) Assignee: Nokia Multimedia Terminals Oy, Turku (FI)

( * ) Notice: Subject to any disclaimer, the term of this patent is extended or adjusted under 35 U.S.C. 154(b) by 1194 days.

(21) Appl. No.: 09/952,320

(22) Filed: Sep. 10, 2001

(65) Prior Publication Data
US 2002/0075256 A1 Jun. 20, 2002

(30) Foreign Application Priority Data
Sep. 13, 2000 (FI) .................................. 20002016

(51) Int. Cl.
H04N 5/06 (2006.01)
H04N 5/08 (2006.01)
H04N 5/10 (2006.01)
H04N 5/50 (2006.01)
H04N 5/445 (2006.01)
H04N 9/45 (2006.01)
H04N 9/455 (2006.01)
H03L 7/00 (2006.01)

(52) U.S. Cl. .................. 348/569; 348/521; 348/525; 348/529; 348/531; 348/563

(58) Field of Classification Search ................ 348/569, 348/563–566, 659, 513–514, 525–527, 521, 348/542, 536–537, 529, 531
See application file for complete search history.

(56) References Cited

U.S. PATENT DOCUMENTS 4,638,360 A * 1/1987 Christopher et al. ........ 348/537
5,812,210 A * 9/1998 Arai et al. ................. 348/555
6,166,777 A * 12/2000 Ock .......................... 348/565
6,175,387 B1 * 1/2001 Han .......................... 348/565
6,421,094 B1 * 7/2002 Han .......................... 348/569
6,466,272 B1 * 10/2002 Arai et al. ................. 348/555
6,556,252 B1 * 4/2003 Kim .......................... 348/565
6,675,388 B1 * 1/2004 Beckmann et al. ......... 725/136
6,681,285 B1 * 1/2004 Ng ............................ 710/309

FOREIGN PATENT DOCUMENTS

| EP | 0584824 | 3/1994 |
| EP | 0840505 | 12/1999 |
| EP | 1011267 | 6/2000 |
| GB | 2310335 | 8/1997 |
| WO | 9914940 | 3/1999 |

* cited by examiner

Primary Examiner—Brian P. Yenke
(74) Attorney, Agent, or Firm—Ware, Fressola, Van Der Sluys & Adolphson LLP

(57) ABSTRACT

A method and an arrangement are disclosed for synchronizing on-screen display functions during analog signal reception in a terminal arrangement that is capable of receiving both digital and analog video signals. There are provided means (312, 313) for generating on-screen display objects. Coupled to said means for generating on-screen display objects, there are synchronization pulse generation means (314) for controlling the generation of on-screen display objects. Comparison means (322) are used for comparing synchronization pulses generated by said synchronization pulse generation means (314) with a synchronization signal obtained (320) from an analog video signal. The result of said comparing as a controlling signal is conveyed (323, 324) to a process (314, 325) of generating said synchronization pulses.

16 Claims, 4 Drawing Sheets

METHOD AND ARRANGEMENT FOR SYNCHRONISING ON-SCREEN DISPLAY FUNCTIONS DURING ANALOG SIGNAL RECEPTION

TECHNOLOGICAL FIELD

The method concerns generally the technology of combining features of analog and digital reception in television and multimedia receivers. Especially the invention concerns the synchronisation measures that are necessary if similar on-screen display functions are to be used both during analog and digital reception.

BACKGROUND OF THE INVENTION

Traditional TV transmissions have been analog by nature. At the priority date of this patent application, the advent of widespread digital TV networks is seen. At least for a certain transition period there will exist a need for hybrid receivers that are able to receive both analog TV transmission of the conventional kind and digital TV and multimedia transmissions. The potential for two-way transmissions in digital multimedia networks suggests that the word "terminal" should gradually replace the word "receiver". In this patent application the word "terminal" is broadly used to designate the device or a number of mutually interacting devices which a end user uses to exploit the services offered through a network or a number of networks which together are capable of conveying both analog television transmissions and digital multimedia traffic.

The reception and processing of analog signals on one hand and digital signals on the other are tasks so different from each other that large portions of the terminal need to be duplicated in order to make it capable of hybrid operation. Combining analog and digital operation has proven to be somewhat problematic regarding some functions of the terminal, like the generation of on-screen display functions, also known as OSD functions for short. OSD functions are typically used as a graphical aid to the user of a terminal during e.g. local configuration and/or control operations. FIG. 1 illustrates certain parts of a prior art hybrid terminal. A digital transport stream is fed into a digital video decoding unit 101 where a demultiplexer 102 separates a video component from it. The separated video component goes into a video decoder 103 which here is an MPEG decoder (Motion Picture Experts Group); the decoder must naturally be selected according to the encoding scheme used in composing the digital video signal. The result of decoding is taken from the video decoder 103 to a graphics generation circuit 104 which also receives OSD-related commands from a processor 105, which in turn has received the OSD-related information e.g. from the user through a remote controller and an infrared link. The task of the graphics generation circuit 104 is to generate the picture frames, selected ones of which may have a part of the frame overlapped by an OSD object such as a menu or an information table.

The output of the graphics generation circuit 104 is coupled in an encoder unit 106 that converts the frames generated in the graphics generation circuit 104 into a suitable standard format accepted by a television set. The PAL, NTSC and SECAM formats are shown as examples in FIG. 1. The encoder unit 106 also generates a fast blanking-type switching signal.

A received analog video signal is coupled to a converter 111 that simply converts it from one analog video signal format to another analog video signal format; such converting is naturally unnecessary if the analog video signal is already in a format accepted by a television set. The standard format and fast blanking outputs of the digital video decoding unit 101 as well as the output of the converter 111 are all coupled to an RGB switch 121 that selects, as controlled by the fast blanking signal, the RGB source to be conveyed through to the television set. The RGB switch is also known as the switching matrix.

Adding OSD to a received analog video signal would most naturally be accomplished by using the same OSD processor and the same graphics generator that are used to add OSD to the digital video signal. However, attempting such a simple solution is known to cause problems. These are mainly related to the difficulty of synchronising the local generation of OSD to the received analog video signal in order to make the graphical OSD objects appear at correct locations on the display. For example a frequency modulated analog video signal received through a satellite includes a certain quantity of impulse noise with relatively large amplitude. If a simple and inexpensive sync signal separator like the known LM1881 of National Semiconductor Inc. is used to extract the horizontal and vertical synchronisation pulses from the received analog video signal, such impulse noise causes interference peaks at the sync separator output which in turn may cause the straight lines of the OSD objects to distort.

A straightforward solution would be to employ a more elaborate sync signal separator. Advanced circuits exist that include inherent noise filtering and pulse regenerating capabilities. However, in their off-the-shelf form such circuits are typically relatively old and expensive. Additionally they usually require a large number of auxiliary components and they may even necessitate some individual tuning, which makes them unattractive to designers of home appliances.

Another known way to solve the problem is to separate the sync signal from the received analog video transmission as usual but to use it directly to synchronise the digital video decoder. If it proves necessary to filter the sync signal this could be performed by appropriate software in the video decoder itself. The drawback of this solution is that it reserves a relatively large amount of processing capacity from the video decoder's processor. Additionally it is usually not advantageous to run the video decoder in slave mode, where its correct operation depends on the continuous reception of adequately clear external sync signals. Noise in the received analog video signal may result in distorted or interrupted operation.

If one is allowed to do major re-engineering on the video decoder, it is possible to integrate filtering and synchronisation hardware therein that could solve the aforementioned problems. However, at the priority date of the present patent application it would be more advantageous if a more conventional video decoder could be used.

SUMMARY OF THE INVENTION

It is an object of the present invention to provide a method and an arrangement for correctly integrating the use of OSD to the reception and viewing of analog video transmissions. It is an additional object of the invention to avoid complex redesigning of existing components in providing the synchronization between OSD and analog video.

The objects of the invention are achieved by comparing a sync signal separated from an analog video transmission to another sync signal coming from a digital video decoder and using the observed phase difference between these sync signals to control an oscillator that gives clock pulses to the digital video decoder.

The invention applies to an arrangement for synchronising on-screen display functions during analog signal reception in a terminal arrangement that is capable of receiving both digital and analog video signals, comprising:
  means for generating on-screen display objects, and
  coupled to said means for generating on-screen display objects, synchronisation pulse generation means for controlling the generation of on-screen display objects;

the arrangement is characterised in that it comprises:
  comparison means for comparing synchronisation pulses generated by said synchronisation pulse generation means with a synchronisation signal obtained from an analog video signal, and
  means for conveying the result of said comparing as a controlling signal to a process of generating said synchronisation pulses.

The invention applies also to a terminal arrangement for simultaneously displaying video images and on screen display objects to a user, the terminal arrangement comprising:
  a set top box that is capable of receiving both digital and analog video signals,
  a television set coupled to said set top box,
  within the set top box, means for generating on-screen display objects, and
  within the set top box, synchronisation pulse generation means for controlling the generation of on-screen display objects:

it is characterised in that it comprises:
  within the set top box, comparison means for comparing synchronisation pulses generated by said synchronisation pulse generation means with a synchronisation signal obtained from an analog video signal,
  within the get top box, means for conveying the result of said comparing as a controlling signal to a process of generating said synchronisation pulses,
  a switching matrix having a first analog graphics input, a second analog graphics input, a switching control input and a program output,
  coupled to said means for generating on-screen display objects, means for generating a fast blanking signal,
  a coupling from said means for generating a fast blanking signal to said switching control input,
  coupled to said means for generating on-screen display objects, means for generating a first analog graphics signal,
  a coupling from said means for generating a first analog graphics signal to said first analog graphics input, and
  means for coupling a received analog video signal to said second analog graphics input.

Additionally the invention applies to a method for synchronising on-screen display functions during analog signal reception in a terminal arrangement that is capable of receiving both digital and analog video signals, comprising the steps of:
  generating on-screen display objects, and
  generating synchronisation pulses for controlling the generation of on-screen display objects;

the method is characterised in that it comprises the steps of:
  comparing synchronisation pulses generated by said synchronisation pulse generation means with a synchronisation signal obtained from an analog video signal, and
  conveying the result of said comparing as a controlling signal to a process of generating said synchronisation pulses.

Certain synchronisation signals exist already in the conventional digital video decoders known at the priority date of the present patent application. An external, voltage-controlled oscillator may be used as the source of clock signals from which the internal sync signals of the digital video decoder are derived. Controlling the oscillation frequency of the voltage-controlled oscillator therefore affects the whole generation of digital video information in the video decoder.

According to the invention, at least one of the internal sync signals of the digital video decoder is taken to a comparator unit that compares its phase relative to that of a corresponding sync signal extracted from the received analog video transmission. Correspondence between sync signals means that they should in the perfect case be the same, like a line synchronisation signal extracted from the received analog video transmission and a line synchronization signal generated within the video decoder. The phase difference between the two sync signals is converted into a controlling signal that controls the oscillation frequency of the above-mentioned external oscillator.

If the phase difference and hence also the frequency of the two sync signals stays the same, synchronisation is perfect and nothing needs to be done. Should the frequency of one of the sync signals start drifting in relation to the other, a phase difference is observed. This phase difference is converted into a corrective feedback signal that tends to counteract the observed change by affecting the generation of the internally generated sync signal. Appropriate filtering is used to reject abrupt changes that can only result from erroneous (noise) pulses in the sync signal received along with the analog video transmission.

The arrangement according to the invention is capable of producing a so-called flywheel effect which means that the correct and generation of distortion-free OSD objects does not depend on the regularity of the sync signal received along with the analog video transmission. Field synchronisation is most advantageously obtained by coupling the field synchronisation signal received along with the analog video transmission into an interrupt input of the processor in the video decoder. The field synchronization signal serves thus both as an initializing signal to the processor and as an indicator of the presence of a correctly received analog video signal: if the processor does not receive interrupts from this direction, the analog video signal is either completely missing or its level is insufficient for adequate displaying quality.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 was discussed in the description of prior art, so the following description of the invention and its advantageous embodiments focuses on FIGS. 2 to 4.

DETAILED DESCRIPTION OF THE INVENTION

Figure 1:
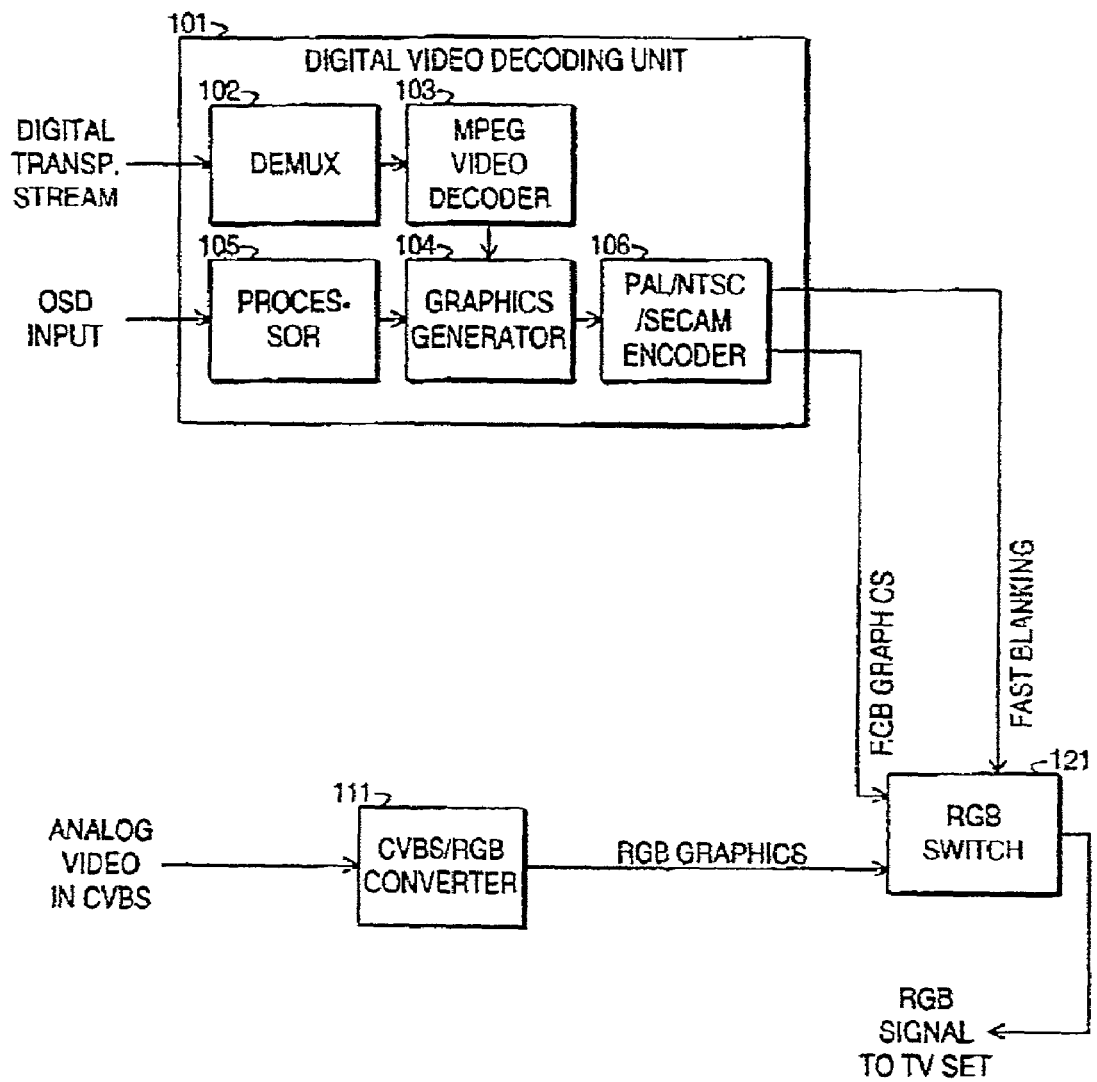
FIG. 1 illustrates a prior art arrangement.
Figure 2:
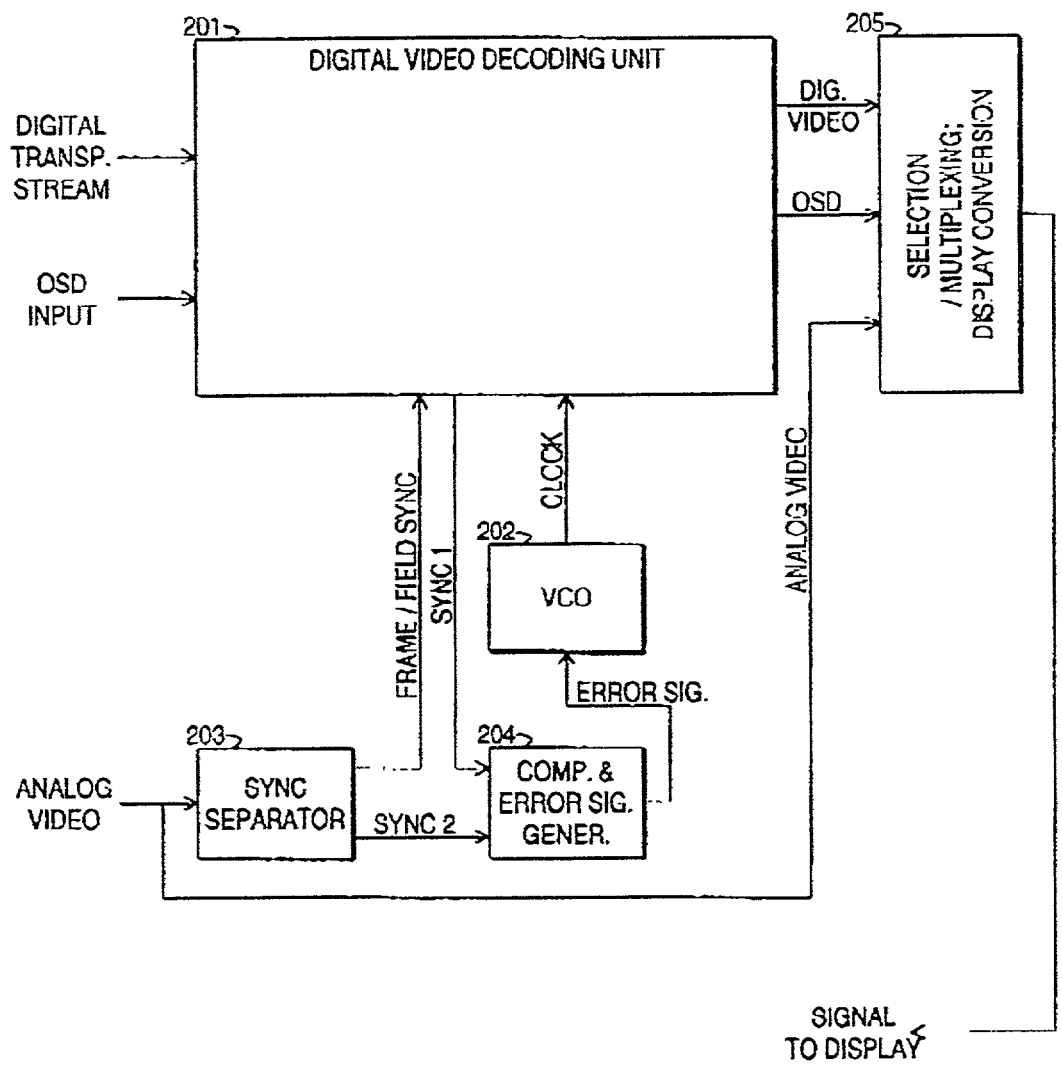
FIG. 2 illustrates the principle of the invention.

FIG. 2 illustrates a digital video decoding unit 201 that in addition to its basic task of demultiplexing and decoding a digital video signal from a digital transport stream is capable of generating OSD objects. A voltage-controlled oscillator 202 is used to provide the digital video decoding unit 201 with a clock signal that serves as a time basis for the generation of OSD objects. Received analog video transmissions are fed into a sync separator block 203 that extracts from the analog video stream a frame or field synchronisation signal to be fed into the digital video decoding unit 201.

A certain first synchronisation signal is taken from the digital video decoding unit 201 and led to the first input of a comparator and error signal generator block 204. The analog sync separator block 203 provides the comparator and error signal generator block 204 with its second input by extracting from the analog video stream a certain second synchronisation signal. The first and second synchronisation signals are comparable to each other in the sense that they (or suitable derivatives therefrom) correspond to the same thing to be synchronised. For example they may both be line synchronisation signals so that in each of them a repeatedly occurring transition signifies the beginning of a new horizontal line in a video image. If the first and second synchronisation signals are mutually in synchronism, the phase difference between them stays constant.

If the first and second synchronisation signals are not in mutual synchronism, the comparator and error signal generator block 204 generates an error signal the value of which is proportional to the difference between the first and second synchronisation signals. The generation of the error signal may involve operations like filtering and amplification. The error signal is fed into the voltage-controlled oscillator 202 where it controls the oscillation frequency thereof.

In order to compose an RGB (RedGreenBlue) signal or other standard format signal suitable for driving a display device; there are appropriate selection, multiplexing and display conversion functions that in FIG. 2 are shown as block 205. Its inputs are the digital video signal demultiplexed and decoded from the digital transport stream, the OSD objects generated in block 201 and the received analog video signal. Said selection, multiplexing and display conversion functions need not be performed in a single circuit or even a single device; later we will describe an embodiment of the invention which illustrates some possibilities of distributing the selection, multiplexing and display conversion functions.

Figure 3:
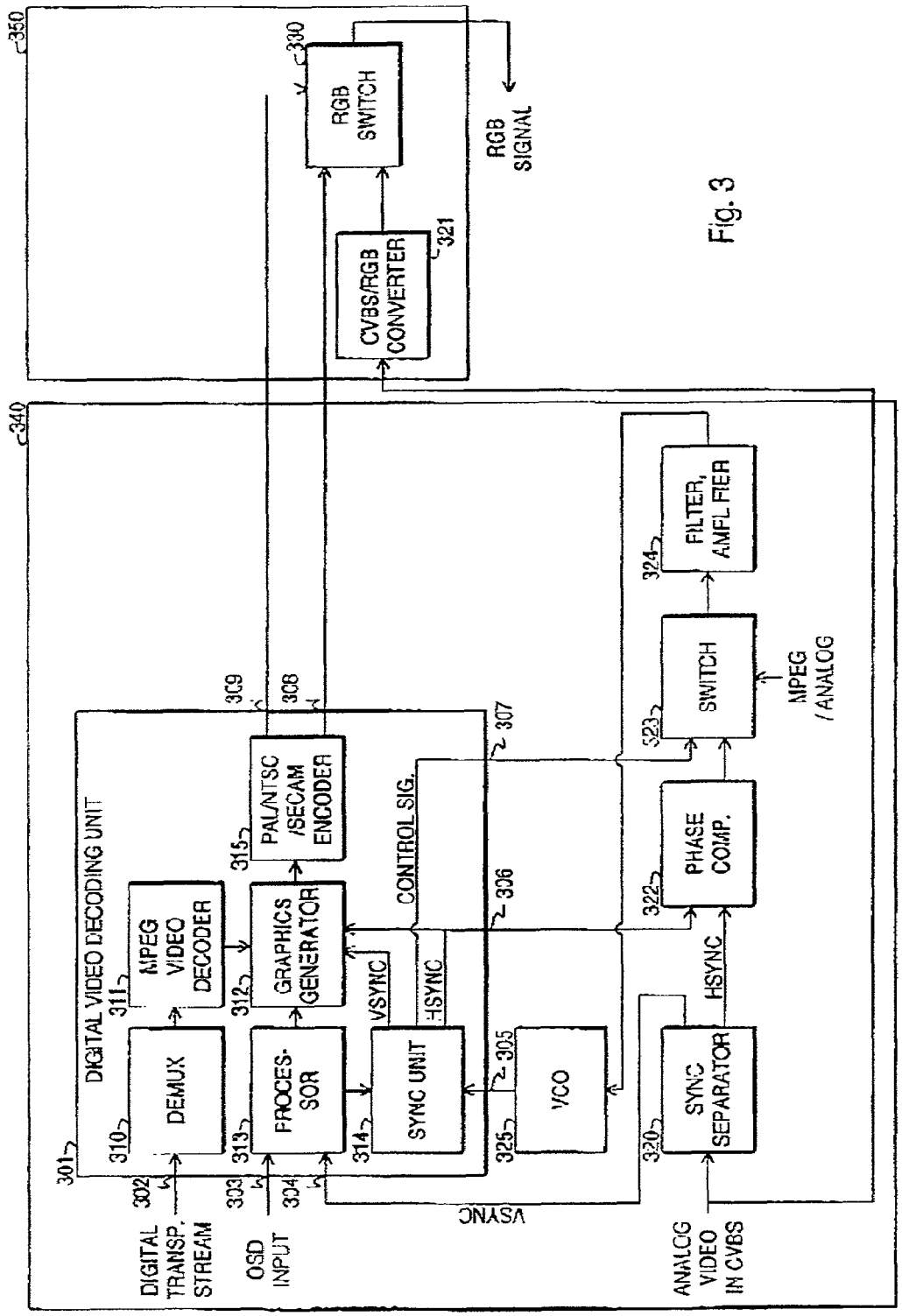
FIG. 3 is a more detailed block diagram realising the principle of FIG. 2

FIG. 3 illustrates a more detailed block diagram where the invention is applied to synchronise the generation of OSD to received analog video signals. A digital video decoding unit 301 has a digital transport stream input 302, an OSD input 303, a coarse synchronisation input 304, a clock signal input 305, a feedback synchronisation output 306, a control signal output 307, an analog graphics output 308 and a switch control output 309 of the so-called fast blanking type. Within the digital video decoding unit 301 the digital transport stream input 302 is coupled to the input of a demultiplexer 310, the output of which is coupled to the input of an MPEG decoder 311. The output of the MPEG decoder 311 is coupled to a first graphics input of a graphics generator 312.

Further within the digital video decoding unit 301 the OSD input 303 is coupled to a first input of a processor 313, and the coarse synchronisation input 304 is coupled to a second input of the processor 313; said second input is most advantageously an IRQ (i.e. interrupt request) input. A first output of the processor 313 is coupled to a second graphics input of the graphics generator 312. The clock signal input of the digital video decoding unit 301 is coupled to an input of an internal synchronisation unit 314. Also an output of the processor 313 is coupled to an input of are synchronisation unit 311. From the synchronisation unit 314 there are two synchronisation outputs, i.e. a vertical synchronisation output and a horizontal synchronisation output, of which the former is coupled to a first synchronisation input of the graphics generator 312. The horizontal synchronisation output is coupled both to a second synchronisation input of the graphics generator 312 and to the feedback synchronisation output 306 of the digital video decoding unit 301. There is also a control signal output from the synchronisation unit 314, which control signal output is coupled to the control signal output 307 of the digital video decoding unit 301.

A graphics output of the graphics generator 312 is coupled to the input of a graphics encoder 315 which in FIG. 3 is capable of producing PAL, NTSC or SECAM format graphics signals according to need. There are two outputs from the video encoder 315 of which the first one is an analog graphics output and the second one is a switching signal output of the fast blanking type. These are both coupled to the similarly named outputs 308 and 309 respectively of the digital video decoding unit 301.

The arrangement of FIG. 3 comprises additionally an analog video input that is coupled to the inputs of both a sync separator unit 320 and an analog graphics converter 321. From the sync separator unit 320 there are two outputs of which a coarse synchronisation output is coupled to the coarse synchronisation input 304 of the digital video decoding unit 301. The other output from the sync separator unit 320 is a fine synchronisation output that is coupled to one input of a phase comparator 322. The other input of the phase comparator 322 is coupled to the feedback synchronization output 306 of the digital video decoding unit 301. The output of the phase comparator 322 is coupled to a first input of a switch 323; another input of the switch 323 is coupled to the control signal output 307 of the digital video decoding unit 301. For setting the switch 323 into a certain state there is a control input to the switch. The output of the switch 323 is coupled to the input of a filtering and amplifying unit 324 the output of which is in turn coupled to the frequency control input of a voltage-controlled oscillator 325. The oscillating output of the voltage-controlled oscillator 325 is coupled to the clock signal input 305 of the digital video decoding unit 301.

The output stage of the arrangement of FIG. 3 consists of a switching matrix 330 that has two analog graphics inputs, one controlling input and an analog graphics output. The analog graphics inputs are coupled to the analog graphics output 308 of the digital video decoding unit 301 and to the output of the analog graphics converter 321 respectively. The controlling input of tie switching matrix 330 is coupled to the switch control output 309 of the digital video decoding unit 301. An analog graphics signal can be obtained from the output of the switching matrix 330. In FIG. 3 this is an RGB signal for the sake of example.

During the exception of a digital transport stream only and the viewing of a video signal coming therewithin the operation of the arrangement of FIG. 3 resembles closely that known from prior art hybrid terminals. The digital video signal to be viewed is demultiplexed from a digital transport stream in the demultiplexer 310 and decoded from its transport-time coded format in the decoder 311. The decoded digital video stream is fed into the graphics generator 312 that converts it into a graphics signal. If OSD objects are to be presented simultaneously on the display, the commands describing these are formulated in the processor 313 and fed into the graphics generator 312 that takes them into account in generating the graphics signal. The generation of OSD objects is synchronised to the decoded digital video signal with the help of vertical and horizontal synchronisation signals obtained from the internal synchronisation unit 314 that generates the synchronisation signals by suitably dividing the stream of clock pulses it receives from the voltage-controlled oscillator 325. The synchronisation unit 314 also generates a control signal that is coupled through the switch 323 and the filtering and amplifying unit 324 to the control input of the voltage-controlled oscillator 325 in order to keep the clock frequency steady.

During the reception of an analog video signal the sync separator 320 extracts from the analog video signal the frame (or field) and line synchronisation pulses. The former are coupled through the coarse synchronisation input 304 to an IRQ input of the processor 313, and the latter are coupled to the phase comparator 322. The voltage-controlled oscillator 325 and internal synchronisation unit 314 are running as in the case of digital reception, but according to the principle of the present invention the horizontal synchronisation signal generated therein is now compared, in the phase comparator 322, with the continuous sequence of line synchronisation pulses coming from the sync separator 320. The switch 323 is now in a different state than in the digital reception case so that it couples the output of the phase comparator 322 through the filtering and amplifying unit 324 to the control input of the voltage-controlled oscillator 325. The control signal coming from the internal synchronisation unit 314 is not used during analog reception.

The frame or field synchronisation pulses coupled from the sync separator to the IRQ input of the processor cause the processor 313 to initialize the internal synchronization unit 314 so that the pace at which it produces synchronisation pulses corresponds at least approximately to the frame or field frequency of the received analog video signal. Initialization means in this context that the internal synchronisation unit 314 is forced to give internal VSYNC signals to the graphics generator 311 roughly at the same time as an external VSYNC comes from the sync separator 320. This arrangement ensures that the OSD is synchronised vertically on the TV screen. This initialization takes place after every channel change, or every time when synchronisation has somehow been lost. The processor 313 may also use the presence of synchronisation pulses at its IRQ input as an indicator of the analog video signal being correctly received; if it does not receive any frame or field synchronisation pulses through the IRQ input the processor may deduce that the analog video signal either doer not exist or comes in at an inadequately low level to be displayed.

After successful initialisation the internal synchronisation unit 314 uses a certain divisor number to divide the clock frequency and to produce the horizontal synchronisation pulses. The phase comparator 322 compares them with the line synchronisation pulses it receives from the sync separator 320. A phase difference, which indicates that the generation of OSD is not in synchronism with the received analog video signals causes the output signal of the phase comparator 322 to achieve a certain non-zero value. Ignoring the role of the filtering and amplifying unit 324 for a while, the non-zero output value of the phase comparator 322 acts as a controlling voltage that determines the oscillation frequency of the voltage-controlled oscillator 325. The sign of the output of the phase comparator 322 must be chosen so that if the observed phase difference shows the horizontal synchronisation pulses to come faster than the line synchronisation pulses of the analog video signal, the oscillation frequency of the voltage-controlled oscillator 325 must be lowered, and vice versa: if the observed phase difference shows the horizontal synchronisation pulses to come slower than the line synchronisation pulses of the analog video signal, the oscillation frequency of the voltage-controlled oscillator 325 must be raised. Perfect synchronism between the internally generated horizontal synchronisation pulses and the line synchronisation pulses of the analog video signal causes the output of the phase comparator to remain zero, which in turn causes the voltage-controlled oscillator 325 to oscillate at its center frequency.

The role of the filtering and amplifying unit 324 is to remove abrupt changes from the output of the phase comparator 322 and to match the output range of the phase comparator 322 to the dynamic range that is required from the voltage-controlled oscillator 325. The filtering task involves mainly low-pass filtering so that the effects of sudden arbitrary interference pulses in the stream of line synchronisation pulses are minimised.

The task of placing the OSD objects onto a display screen simultaneously with the graphical images received as an analog video signal is accomplished by rapidly switching the selected program source in the switching matrix 330. The signal that controls the switching is the fast blanking signal obtained through the switch control output 309 of the digital video decoding unit 301. If the terminal arrangement consists of a television set and a set top box coupled thereto with a SCART cable comprising a conductor for the fast blanking signal, the elements 321 and 330 may well be located in the television set whereas the rest of the elements shown in FIG. 3 are located within the set top box. Boundary 340 illustrates the domain of the set top box and boundary 350 illustrates the domain of the television set in such a case. In an alternative case all blocks illustrated in FIG. 3 are located within the set top box and only an RGB signal (or other suitable displayable signal) is conveyed from the set top box to the television set. Naturally the principle of the invention may also be applied in a television set that is itself capable of receiving both digital and analog video signals without the help of a separate set top box. In that case all blocks illustrated in FIG. 3 are located within the television set.

Figure 4:
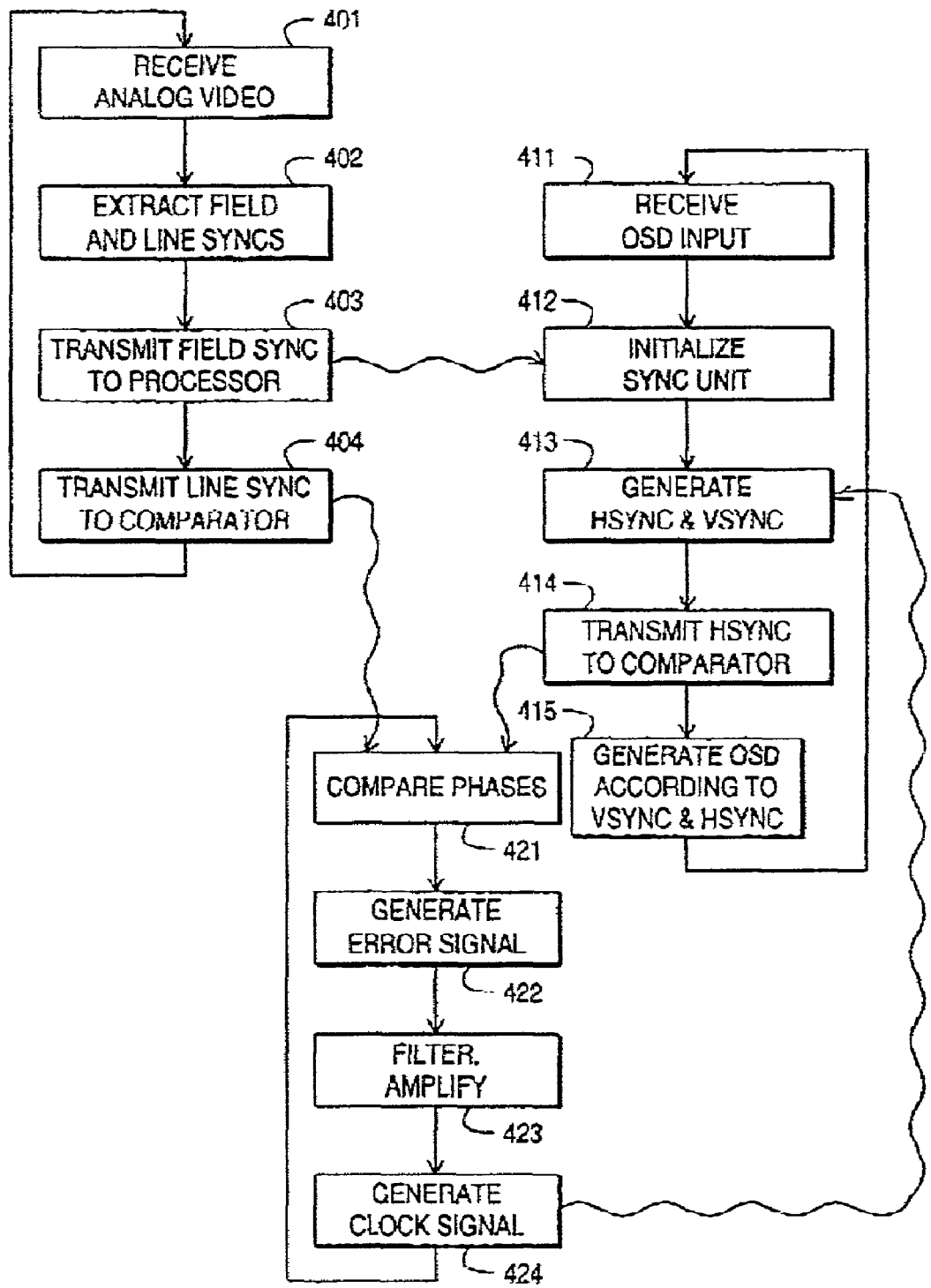
FIG. 4 illustrates a method according to an embodiment of the invention.

The method according to an embodiment of the invention is illustrated as a flow diagram in FIG. 4. The procedural steps are arranged into three groups according to which entity or group of entities is performing the steps. Exchange of information between entities or groups of entities is shown with wavy lines. The loop consisting of states 401, 402, 403 and 404 is circled by the sync separator, which receives the analog video signal, extracts the field and line synchronisation signals from it and transmits these to the processor and the phase comparator respectively. The digital video decoding unit performs repeatedly the steps 411, 412, 413, 414 and 415 where it receives OSD input, initialises the internal synchronization unit after having received the field synchronisation pulses, generates the HSYNC and VSYNC signals in order to correctly generate the OSD objects, transmits HSYNC to the phase comparator and generates the OSD. The entities that in FIG. 3 are shown as 322, 323, 324 and 325 perform the phase comparison between the line synchronisation signals, generates and processes the error signal and adjusts appropriately the oscillation frequency that controls the generation of sync pulses in the digital video decoding unit.

In the method and arrangement according to the invention the digital video decoding unit is in master mode, which means that is does not depend on the existence of synchronisation signals extracted from the analog video signal. The invention gives rise to a so-called freewheeling effect: the generation of synchronisation pulses for the purposes of OSD continues even if there is a temporary interruption in the reception of synchronisation pulses in the analog video signal. The invention is applicable regardless of the formal of the incoming analog video signal and regardless of the graphics format which the television or other display device accepts, as long as appropriate converters such as the units 315 and 321 in FIG. 2 are present. The use and construction of such converters are known as such to the person skilled in the art.

During the reception and viewing of analog video signals the demultiplexer and digital video decoder, which in FIG. 3 are shown as blocks 310 and 311, may be switched off to save power, whereas during the reception and viewing of digital video they must naturally be fully operational. Also the switch which selects either the control signal coming from the internal synchronisation unit or the comparison result from the phase comparator as the one which has an effect on the voltage-controlled oscillator's oscillation frequency must be set to the appropriate state. There must be within the terminal arrangement some controlling entity that is aware of whether a digital transport stream or an analog video signal serves as the current program source and that performs the above-mentioned switching functions.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The invention claimed is:

1. Apparatus, comprising:
 means for digitally generating on-screen display objects,
 coupled to said means for digitally generating on-screen display objects, means for controlling the generation of on-screen display objects,
 means for comparing a phase of synchronisation pulses generated by said means for controlling the generation of on-screen display objects with a phase of a synchronisation signal obtained from an analog video signal, and
 means for conveying the result of said comparing as a controlling signal to a process of generating said synchronisation pulses.

2. Apparatus according to claim 1, comprising:
 means for providing a time base to said means for controlling the generation of on-screen display objects, and
 means for conveying the result of said comparing as a controlling signal to said means for providing a time base.

3. A terminal arrangement for simultaneously displaying video images and on-screen display objects to a user, the terminal arrangement comprising:
 a set top box that is capable of receiving both digital and analog video signals,
 a television set coupled to said set top box,
 within the set top box, means for generating on-screen display objects,
 within the set top box, synchronisation pulse generation means for controlling the generation of on-screen display objects,
 within the set top box, comparison means for comparing synchronisation pulses generated by said synchronisation pulse generation means with a synchronisation signal obtained from an analog video signal,
 within the set top box, means for conveying the result of said comparing as a controlling signal to a process of generating said synchronisation pulses,
 a switching matrix having a first analog graphics input, a second analog graphics input, a switching control input and a program output,
 coupled to said means for generating on-screen display objects, means for generating a fast blanking signal.
 a coupling from said means for generating a fast blanking signal to said switching control input,
 coupled to said means for generating on-screen display objects, means for generating a first analog graphics signal,
 a coupling from said means for generating a first analog graphics signal to said first analog graphics input, and
 means for coupling a received analog video signal to said second analog graphics input.

4. A terminal arrangement according to claim 3, wherein said switching matrix is located within the set top box.

5. A terminal arrangement according to claim 3, wherein said switching matrix is located within the television set, so that the coupling between the set top box and the television set comprises means for conveying said fast blanking signal between the set top box and the television set.

6. A method for synchronising on-screen display functions during analog signal reception in a terminal arrangement that is capable of receiving both digital and analog video signals, comprising:
 digitally generating on-screen display objects,
 generating synchronisation pulses for controlling the generation of on-screen display objects,
 comparing a phase of synchronisation pulses generated by a synchronization unit with a phase of a synchronisation signal obtained from an analog video signal, and
 conveying the result of said comparing as a controlling signal to a process of generating said synchronisation pulses.

7. A method according to claim 6, further comprising:
 using an oscillator for providing a time base to said generation of synchronisation pulses, and
 conveying the result of said comparing as a controlling signal to said oscillator, so that the result of said comparing determines the oscillation frequency of said oscillator.

8. A method according to claim 6, further comprising:
 obtaining a field synchronisation signal from said analog video signal, and
 using said field synchronisation signal to initialize the process of generating said synchronisation pulses.

9. A method according to claim 8, wherein using said field synchronsiation signal to initialize the process of generating said synchronisation pulses comprises selecting a divisor for a certain programmable divider to be used in generating said synchronisation pulses from a clock signal.

10. Apparatus, comprising:
 a graphics generator configured to digitally generate on-screen display objects;

coupled to said graphics generator, a synchronization unit configured to control the generation of on-screen display objects;

a phase comparator configured to compare a phase of synchronization pulses generated by said synchronization unit with a phase of a synchronization signal obtained from an analog video signal; and a coupling from an output of said phase comparator to said synchronization unit, configured to deliver a controlling signal to the generation of said synchronization pulses.

11. Apparatus according to claim 10, further comprising:

an oscillator configured to provide a time base to said synchronization unit; and a coupling configured to convey the result of said comparing as a controlling signal to said oscillator.

12. Apparatus according to claim 10, further comprising a coupling configured to couple a synchronization signal obtained from an analog video signal as a coarse synchronisation signal to said graphics generator.

13. Apparatus, comprising:

a graphics generator configured to digitally generate on-screen display objects;

coupled to said graphics generator, a synchronization unit configured to control the generation of on-screen display objects;

a phase comparator configured to compare a phase of synchronization pulses generated by said synchronization unit with a phase of a synchronization signal obtained from an analog video signal;

a coupling from an output of said phase comparator to said synchronization unit, configured to deliver a controlling signal to the generation of said synchronization pulses;

an oscillator configured to provide a time base to said synchronization unit;

a coupling configured to convey the result of said comparing as a controlling signal to said oscillator;

a controllable switch having two inputs and an output;

a coupling from an output of said synchronization unit to one input of said switch;

a coupling from an output of said phase comparator to another input of said switch; and a coupling from the output of said switch to said oscillator; wherein depending on the state of said switch either said output of said synchronization unit or said output of said phase comparator coupled to control said oscillator.

14. Apparatus, comprising:

a graphics generator configured to digitally generate on-screen display objects;

coupled to said graphics generator, a synchronization unit configured to control the generation of on-screen display objects;

a phase comparator configured to compare a phase of synchronization pulses generated by said synchronization unit with a phase of a synchronization signal obtained from an analog video signal;

a coupling from an output of said phase comparator to said synchronization unit, configured to deliver a controlling signal to the generation of said synchronization pulses;

an oscillator configured to provide a time base to said synchronization unit;

a coupling configured to convey the result of said comparing as a controlling signal to said oscillator; and a filter and amplifier unit between said phase comparator and said oscillator, said filter and amplifier unit being arranged to filter out interference from the output of said phase comparator and to match the output range of said phase comparator to the control input range of said oscillator.

15. Apparatus, comprising:

a graphics generator configured to digitally generate on-screen display objects;

coupled to said graphics generator, a synchronization unit configured to control the generation of on-screen display objects;

a phase comparator configured to compare a phase of synchronization pulses generated by said synchronization unit with a phase of a synchronization signal obtained from an analog video signal;

a coupling from an output of said phase comparator to said synchronization unit, configured to deliver a controlling signal to the generation of said synchronization pulses;

as a part of said synchronization unit, a programmable divider arranged to divide a clock signal by a programmable divisor; and coupled to said programmable divider, a processor capable of setting the value of said programmable divisor;

wherein a synchronization signal obtained from an analog video signal is coupled as a coarse synchronization signal to said processor, and said processor is arranged to set the value of said programmable divisor on the basis of the coarse synchronization signal it has received.

16. Apparatus, comprising:

a graphics generator configured to digitally generate on-screen display objects;

coupled to said graphics generator, a synchronization unit configured to control the generation of on-screen display objects;

a phase comparator configured to compare a phase of synchronization pulses generated by said synchronization unit with a phase of a synchronization signal obtained from an analog video signal;

a coupling from an output of said phase comparator to said synchronization unit, configured to deliver a controlling signal to the generation of said synchronization pulses;

a switching matrix having a first analog graphics input, a second analog graphics input, a switching control input and a program output;

coupled to said graphics generator, an encoder configured to generate a fast blanking signal, and configured to generate a first analog graphics signal;

a coupling from said encoder to said switching control input;

a coupling from said encoder to said first analog graphics input, and a coupling configured to couple a received analog video signal to said second analog graphics input.

* * * * *